(12) United States Patent
Hamauzu et al.

(10) Patent No.: US 8,973,696 B2
(45) Date of Patent: Mar. 10, 2015

(54) MOTORCYCLE

(75) Inventors: Akira Hamauzu, Saitama (JP); Tetsuo Takeshige, Saitama (JP); Kotaro Fujiyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 324 days.

(21) Appl. No.: 13/393,057

(22) PCT Filed: Aug. 31, 2010

(86) PCT No.: PCT/JP2010/064841
§ 371 (c)(1),
(2), (4) Date: Apr. 16, 2012

(87) PCT Pub. No.: WO2011/025043
PCT Pub. Date: Mar. 3, 2011

(65) Prior Publication Data
US 2012/0186895 A1 Jul. 26, 2012

(30) Foreign Application Priority Data
Aug. 31, 2009 (JP) .................................. 2009-200502

(51) Int. Cl.
| | |
|---|---|
| *B62K 11/04* | (2006.01) |
| *B62K 19/30* | (2006.01) |
| *B62K 19/38* | (2006.01) |
| *B60T 8/32* | (2006.01) |
| *B60T 8/36* | (2006.01) |
| *B62J 6/18* | (2006.01) |

(52) U.S. Cl.
CPC ............... *B60T 8/3225* (2013.01); *B62K 19/30* (2013.01); *B60T 8/3685* (2013.01); *B60Y 2200/12* (2013.01); *B62J 6/18* (2013.01); *B62K 11/04* (2013.01); *B62K 19/38* (2013.01)

USPC ............................................ 180/219; 180/311

(58) Field of Classification Search
CPC ..... B60T 8/3225; B60T 8/3685; B62K 11/02; B62K 11/04; B62K 19/30; B62K 19/38; B62L 3/00
USPC ................ 180/219, 311, 312; 303/9.63, 9.64, 303/9.75, 137
See application file for complete search history.

(56) References Cited

U.S. PATENT DOCUMENTS 4,456,310 A * 6/1984 Hayashi et al. .................. 303/10
4,690,236 A * 9/1987 Shinozaki et al. ............ 180/219

(Continued)

FOREIGN PATENT DOCUMENTS

| EP | 0 624 498 A2 | 11/1994 |
|---|---|---|
| EP | 1 679 243 A1 | 7/2006 |

(Continued)

*Primary Examiner* — Anne Marie Boehler
*Assistant Examiner* — Maurice Williams
(74) *Attorney, Agent, or Firm* — Birch, Stewart, Kolasch & Birch, LLP (57) ABSTRACT

To provide a motorcycle in which a distinction between a main harness and ABS pipes can be easily made to enhance flexibility of packaging design of the motorcycle and to facilitate operations for assembly and piping, thereby improving productivity of the motorcycle.

A main harness 50 for supplying electric power from a battery 61 to multiple electric components 62 to 67 is arranged on one side in a right-to-left direction of a vehicle 10, and ABS pipes 101, 102 and 106 for transmitting a hydraulic pressure to a brake caliper 74 are arranged on the other side in the right-to-left direction of the vehicle 10.

1 Claim, 13 Drawing Sheets

(56) References Cited

U.S. PATENT DOCUMENTS

| | | | |
|---|---|---|---|
| 4,809,999 A * | 3/1989 | Tozawa et al. | 280/281.1 |
| 5,419,625 A | 5/1995 | Iwase et al. | |
| 6,193,005 B1 * | 2/2001 | Jurrens | 180/227 |
| 6,273,523 B1 * | 8/2001 | Wakabayashi et al. | 303/9.61 |
| 6,547,027 B1 * | 4/2003 | Kalhok et al. | 180/312 |
| 7,690,461 B2 * | 4/2010 | Isoda | 180/68.3 |
| 7,730,986 B2 * | 6/2010 | Takeshima et al. | 180/68.5 |
| 8,579,064 B2 * | 11/2013 | Oohashi et al. | 180/219 |
| 2002/0007977 A1 * | 1/2002 | Ishii et al. | 180/219 |
| 2005/0134114 A1 * | 6/2005 | Asahi | 303/137 |
| 2007/0075845 A1 * | 4/2007 | Kawamura et al. | 340/425.5 |
| 2007/0200430 A1 * | 8/2007 | Tani | 303/137 |
| 2010/0032225 A1 * | 2/2010 | Oohashi et al. | 180/219 |

FOREIGN PATENT DOCUMENTS

| | | |
|---|---|---|
| JP | 4-260847 A | 9/1992 |
| JP | 6-321078 A | 11/1994 |
| JP | 8-239074 A | 9/1996 |
| JP | 9-249178 A | 9/1997 |
| JP | 11-314590 A | 11/1999 |
| JP | 2006-192980 A | 7/2006 |
| JP | 2007-8375 A | 1/2007 |

* cited by examiner

FIG.13

MOTORCYCLE

TECHNICAL FIELD

The present invention relates to a motorcycle, and more specifically to the arrangements of a main harness and ABS pipes of a motorcycle.

BACKGROUND ART

As a conventional motorcycle, there are known a motorcycle in which a main harness for supplying electric power to multiple electrical components is arranged on the right side of a vehicle (see Patent Document 1, for example) and a motorcycle in which ABS pipes for an ABS (anti-lock braking system) are arranged on the right side of a vehicle (see Patent Document 2, for example).

PRIOR ART DOCUMENTS

Patent Documents

Patent Document 1: JP-A-04-260847
Patent Document 2: JP-A-2007-008375

SUMMARY OF INVENTION

Problem to be Solved by the Invention

Since a conventional motorcycle is provided with a side stand on the left side of a vehicle, a vehicle body is tilted to the left side. Accordingly, the main harness is often passed through the right side of the vehicle body where water is less likely to be accumulated. Meanwhile, in a model of a certain vehicle type equipped with an ABS system, ABS pipes for brakes on front and rear wheels of the vehicle (in which a brake caliper for the rear wheel is provided on the right side) are arranged from the front to the rear of the vehicle. For this reason, when the main harness and the ABS pipes are arranged together on the right side of the vehicle as described in the above Patent Documents 1 and 2, flexibility of wiring design of the harness and the pipes is reduced, which may make it difficult not only to make packaging design of the motorcycle but also to perform operations for assembly and piping of the main harness and the ABS pipes, thereby lowering productivity of the motorcycle.

The present invention has been made in view of the foregoing circumstances and an object thereof is to provide a motorcycle in which a distinction between a main harness and ABS pipes can be easily made to enhance flexibility of packaging design of the motorcycle and to facilitate operations for assembly and piping, thereby improving productivity of the motorcycle.

Means for Solving the Problems

In order to achieve the above object, the invention is characterized in that, in a motorcycle including: a main harness connected to a battery and arranged to extend in a front-to-back direction of a vehicle in order to supply electric power to a plurality of electrical components provided on the vehicle; an anti-lock braking system connected to brake calipers for a front wheel and a rear wheel and configured to adjust a brake hydraulic pressure depending on brake lock conditions of the front wheel and the rear wheel; and anti-lock braking system pipes configured to transmit the brake hydraulic pressure of the anti-lock braking system, the main harness is arranged on one side in a right-to-left direction of the vehicle and the anti-lock braking system pipes are arranged on the other side in the right-to-left direction of the vehicle.

In addition to the configuration of the invention above, the invention is characterized by further including a vehicle body frame including a right and left pair of frames, and in that the main harness and the anti-lock braking system pipes are arranged along the right and left pair of frames.

In addition to the configuration above, the invention is characterized in that the brake calipers for the front wheel and the rear wheel are provided on the vehicle while being offset to the right with respect to a vehicle body center line, and the battery is provided on the vehicle while being offset to the left with respect to the vehicle body center line, an anti-lock braking system modulator of the anti-lock braking system is provided on the vehicle while being offset to the right with respect to the vehicle body center line, and the main harness is provided on the left frame of the right and left pair of the frames and the anti-lock braking system pipes are provided on the right frame of the right and left pair of the frames.

In addition to the configuration of the invention above, the invention is characterized by further including engine electrical components including a heaterless oxygen sensor, an ignition coil, and a regulator, and in that at least one of the heaterless oxygen sensor, the ignition coil, and the regulator is arranged on the left side of the vehicle body center line.

In addition to the configuration of the invention above, the invention is characterized in that all of the heaterless oxygen sensor, the ignition coil, and the regulator are arranged on the left side of the vehicle body center line.

Advantage of the Invention

According to an aspect of the motorcycle, the distinction between the main harness and the ABS pipes can be easily made because the main harness is arranged on the one side in the right-to-left direction of the vehicle while the ABS pipes are arranged on the other side in the right-to-left direction of the vehicle. Thus, it is possible to enhance flexibility of packaging design of the motorcycle and to facilitate operations for assembly and piping of the main harness and the ABS pipes, thereby improving productivity of the motorcycle.

According to another aspect of the motorcycle, the main harness and the ABS pipes are arranged along the right and left pair of frames of the vehicle body frame. Hence the distinction between the main harness and the ABS pipes can be easily made by the right and left frames. Thus, it is possible to further facilitate the operations for assembly and piping of the main harness and the ABS pipes, thereby further improving productivity of the motorcycle.

According to another aspect of the motorcycle, the brake calipers for the front and rear wheels are provided on the vehicle while being offset to the right with respect to the vehicle body center line, and the battery is provided on the vehicle while being offset to the left with respect to the vehicle body center line. Meanwhile, the ABS modulator of the ABS system is provided on the vehicle while being offset to the right with respect to the vehicle body center line, the main harness is provided on the frame on the left side of the right and left pair of the frames, and the ABS pipes are provided on the frame on the right side of the right and left pair of the frames. Therefore, the main harness including multiple electrical wires and having no limitation of flexibility of design is arranged on the left side of the vehicle as in the case of the battery while the ABS pipes being made of metallic pipes and having a limitation of flexibility of design is arranged on the right side of the vehicle as in the case of the brake calipers for the front and rear wheels as well as the ABS modulator. Thus, lengths of the main harness and the ABS pipes can be minimized to suppress manufacturing costs of the motorcycle.

According to according to another aspect of the motorcycle, the engine electrical components including the heaterless $O_2$ sensor, the ignition coil, and the regulator are provided on the vehicle. At least one of the heaterless $O_2$ sensor, the ignition coil, and the regulator is arranged on the left side of the vehicle body centerline. Accordingly, at least one of the heaterless $O_2$ sensor, the ignition coil, and the regulator is arranged on the same side as the main harness which is arranged on the left side of the vehicle. Thus, the length of the main harness can be minimized to suppress manufacturing costs of the motorcycle and to facilitate a wiring operation of the main harness.

According to another aspect of the motorcycle, all of the heaterless $O_2$ sensor, the ignition coil, and the regulator are arranged on the left side of the vehicle body center line. Hence all of the heaterless $O_2$ sensor, the ignition coil, and the regulator are arranged on the same side as the main harness which is arranged on the left side of the vehicle. Thus, the length of the main harness can be minimized to further suppress manufacturing costs of the motorcycle and to further facilitate the wiring operation of the main harness.

DESCRIPTION OF EMBODIMENTS

Hereinafter, an embodiment of a motorcycle according to the present invention will be described in detail with reference to the drawings. Note that the drawings are supposed to be viewed in directions of reference numerals. In the following description, front-to-back, right-to-left, and up-and-down directions are supposed to be in accordance with directions viewed from a driver, and the drawings indicate a front side of a vehicle as Fr, a rear side as Rr, a left side as L, a right side as R, an upper side as U, and a lower side as D. Moreover, in this embodiment, a main harness will be described by using FIG. 2 to FIG. 6 while a braking apparatus and an ABS of the same vehicle will be described by using FIG. 7 to FIG. 13 in order to facilitate understanding of the drawings.

Figure 1:
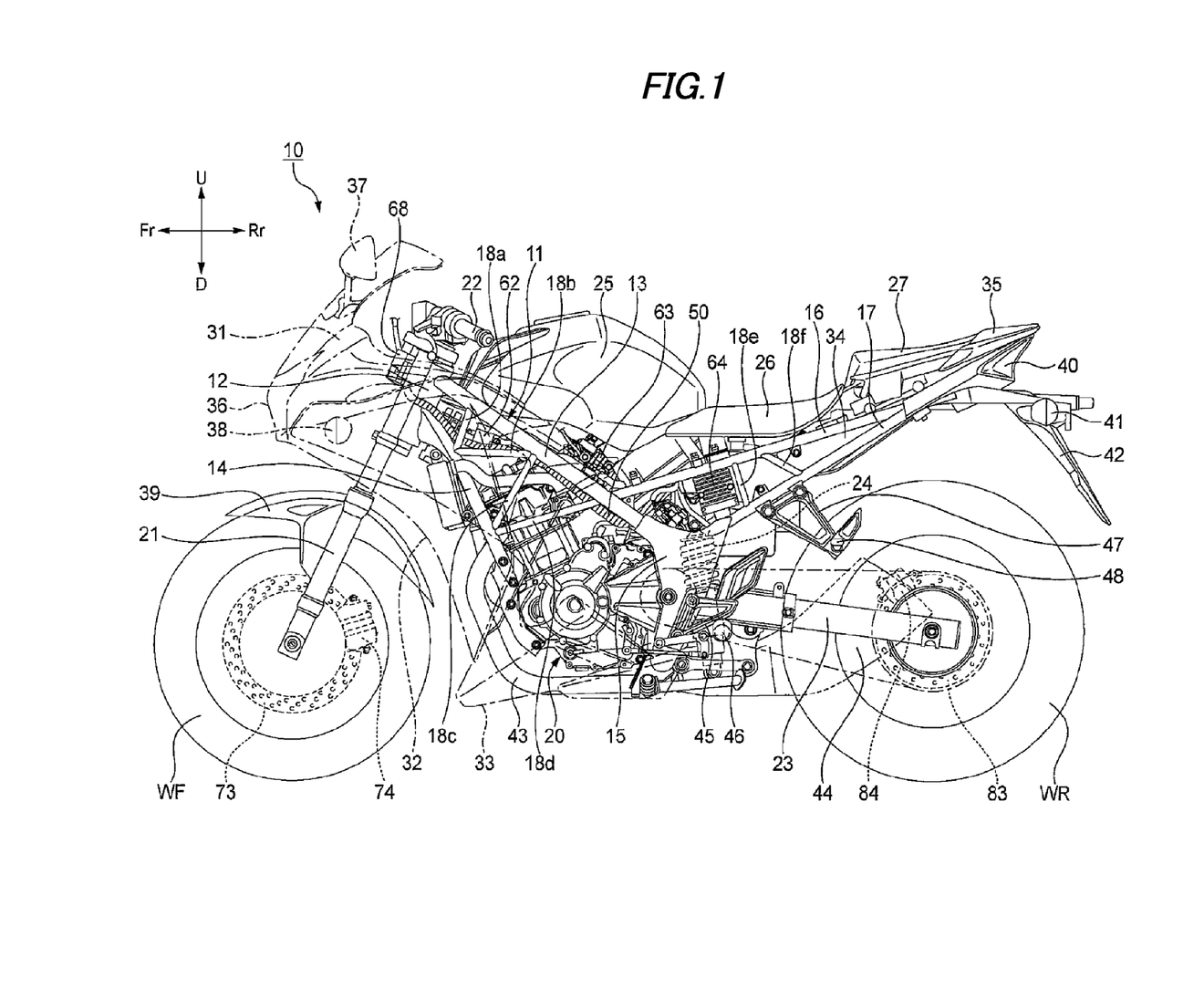
FIG. 1 is a left-side view for explaining an embodiment of a motorcycle according to the present invention.

As shown in FIG. 1, a motorcycle 10 of this embodiment includes a vehicle body frame 11 which is formed of a head pipe 12 provided on a front end, a right and left pair of main frames 13 extending backward and downward from the head pipe 12, a right and left pair of down tubes 14 extending backward and downward from the head pipe 12, a right and left pair of pivot plates 15 connected to rear end portions of the right and left pair of main frames 13, a right and left pair of seat frames 16 being connected to rear portions of the right and left pair of main frames 13 and extending backward and upward, a right and left pair of sub-frames 17 being connected to the pivot plates 15, extending backward and upward, and having rear end portions connected to rear end portions of the seat frames 16, first to fourth reinforcing frames 18a, 18b, 18c, and 18d connected between the main frames 13 and the down tubes 14, and fifth and sixth reinforcing frames 18e and 18f connected between the sear frames 16 and the sub-frames 17. A single-cylinder four-stroke engine 20 is attached to the down tubes 14 and the pivot plates 15.

Moreover, the motorcycle 10 includes a right and left pair of front forks 21 steerably supported on the head pipe 12, a front wheel WF rotatably supported by lower end portions of the front forks 21, a steering handle 22 attached to upper end portions of the front forks 21, a right and left pair of swing arms 23 swingably supported by the pivot plates 15 via swing arm pivots 23a, a rear wheel WR rotatably supported by rear end portions of the swing arms 23, rear cushions 24 provided between the swing arms 23 and the pivot plates 15, a fuel tank 25 provided above the main frames 13, and a driver seat 26 as well as a pillion seat 27 provided above the seat frames 16.

Here, in FIG. 1, reference numeral 31 denotes a front cowl, reference numeral 32 denotes a front side cowl, reference numeral 33 denotes an under cowl, reference numeral 34 denotes a side cowl, reference numeral 36 denotes a head light, reference numeral 37 denotes a side mirror, reference numeral 38 denotes a front blinker, reference numeral 39 denotes a front fender, reference numeral 40 denotes a tail light, reference numeral 41 denotes a rear blinker, reference numeral 42 denotes a rear fender, reference numeral 43 denotes an exhaust pipe, reference numeral 44 denotes a muffler, reference numeral 45 denotes a main step holder, reference numeral 46 denotes a main step, reference numeral 47 denotes a pillion step holder, reference numeral 48 denotes a pillion step, and reference numeral 49 denotes a radiator.

Figure 2:
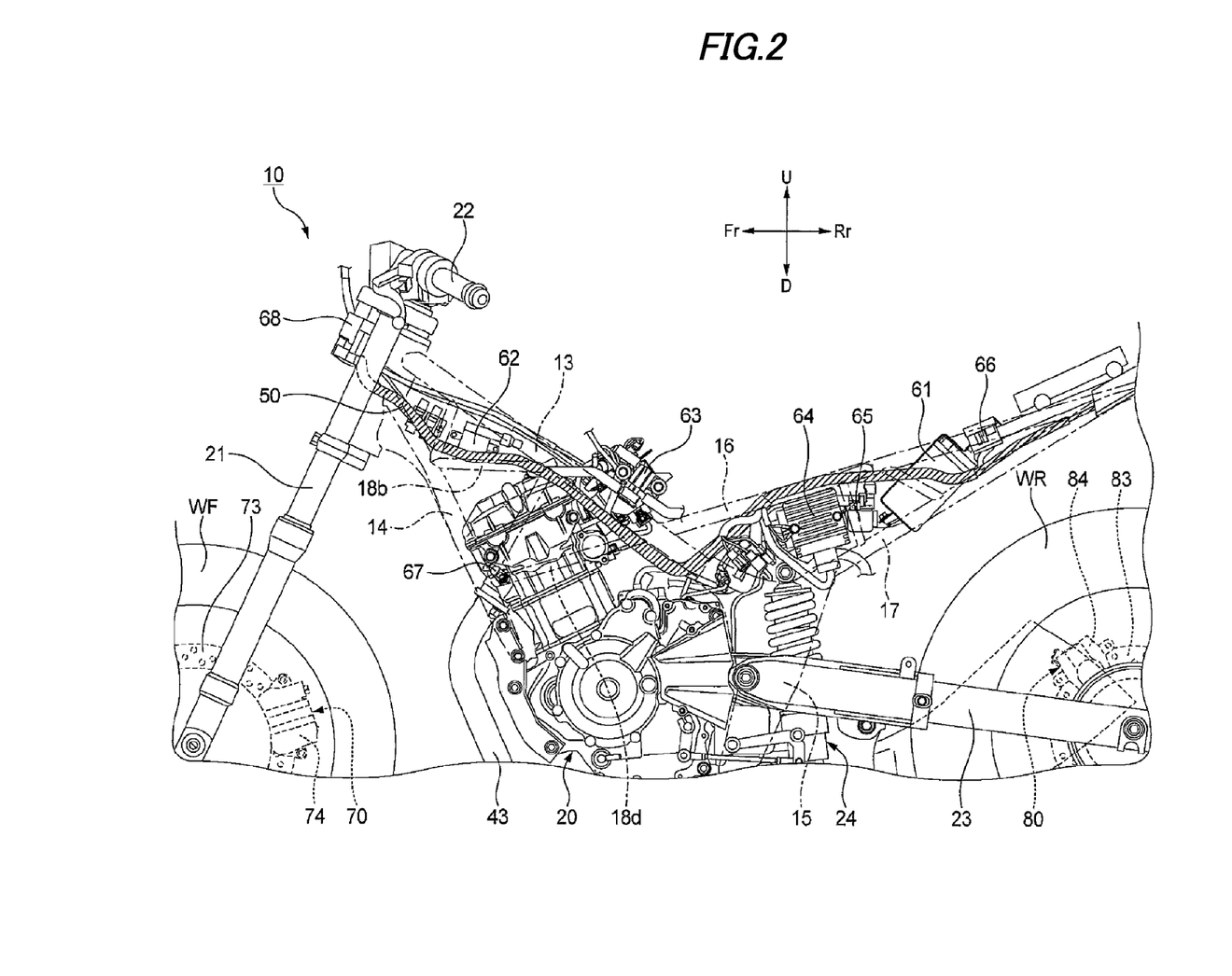
FIG. 2 is a left-side view of the motorcycle shown in FIG. 1 in which a vehicle body cover and a vehicle body frame are detached therefrom.
Figure 3:
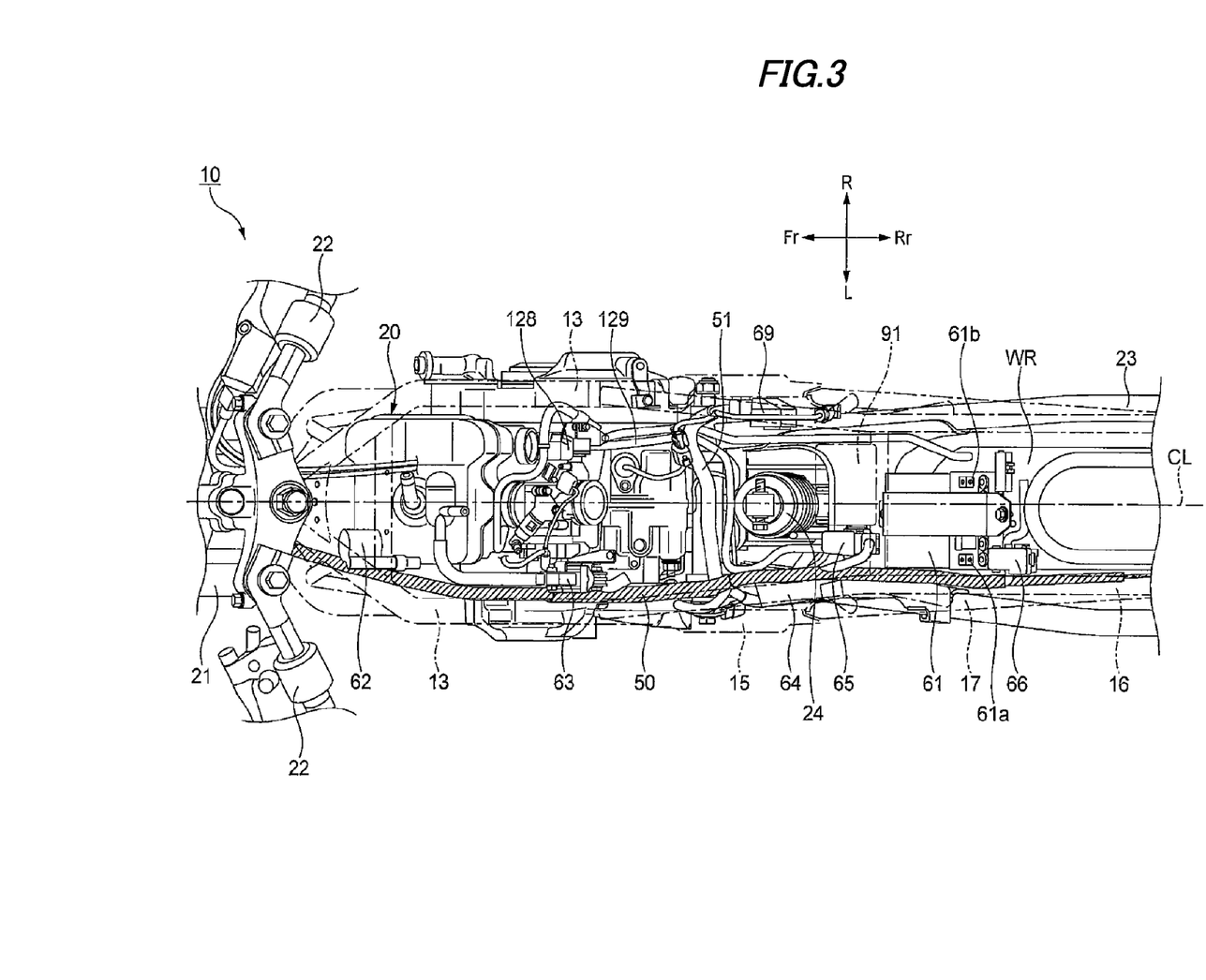
FIG. 3 is a plan view of the motorcycle shown in FIG. 2.
Figure 5:
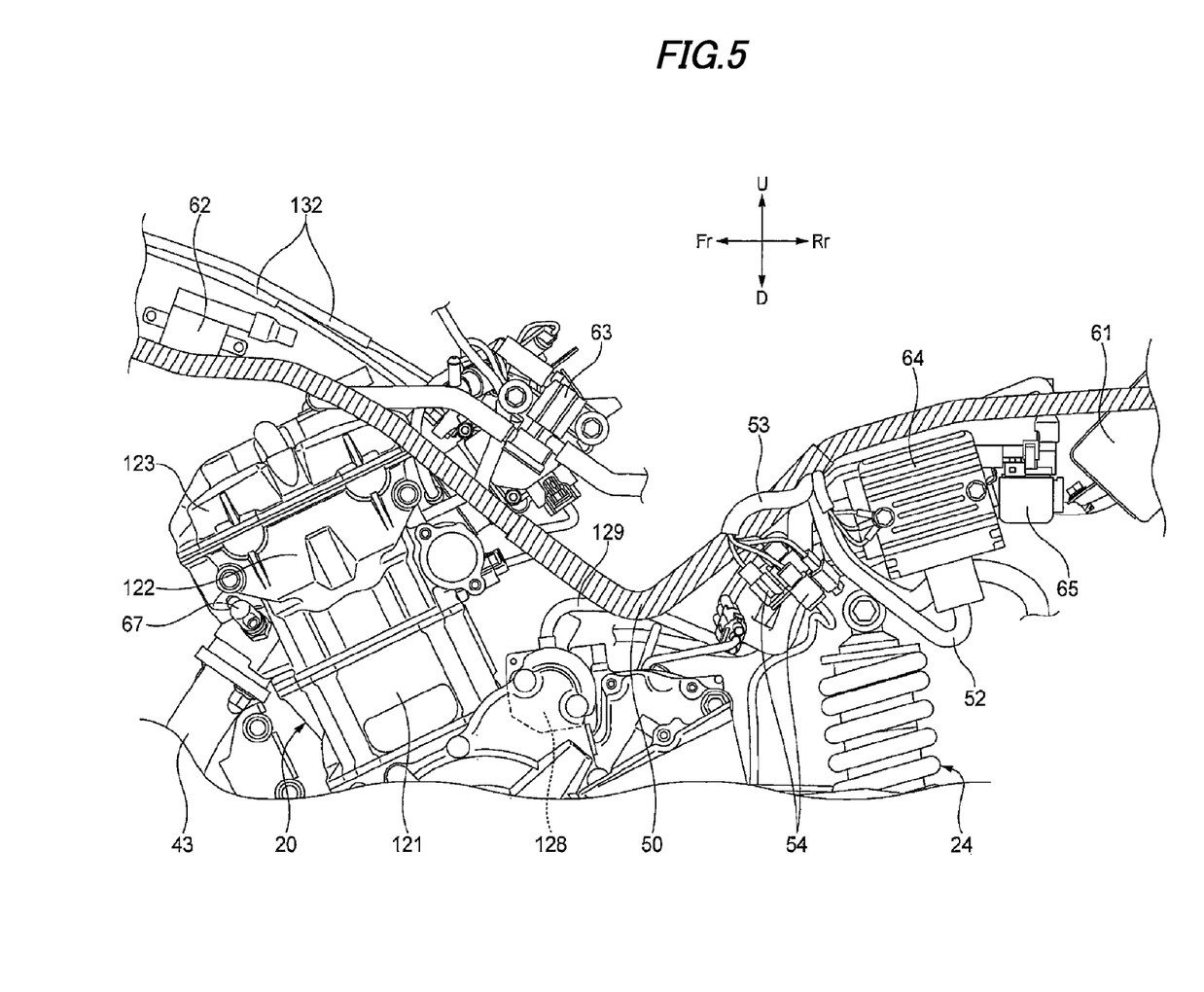
FIG. 5 is a left-side view of the peripheral part of the main harness shown in FIG. 2.
Figure 6:
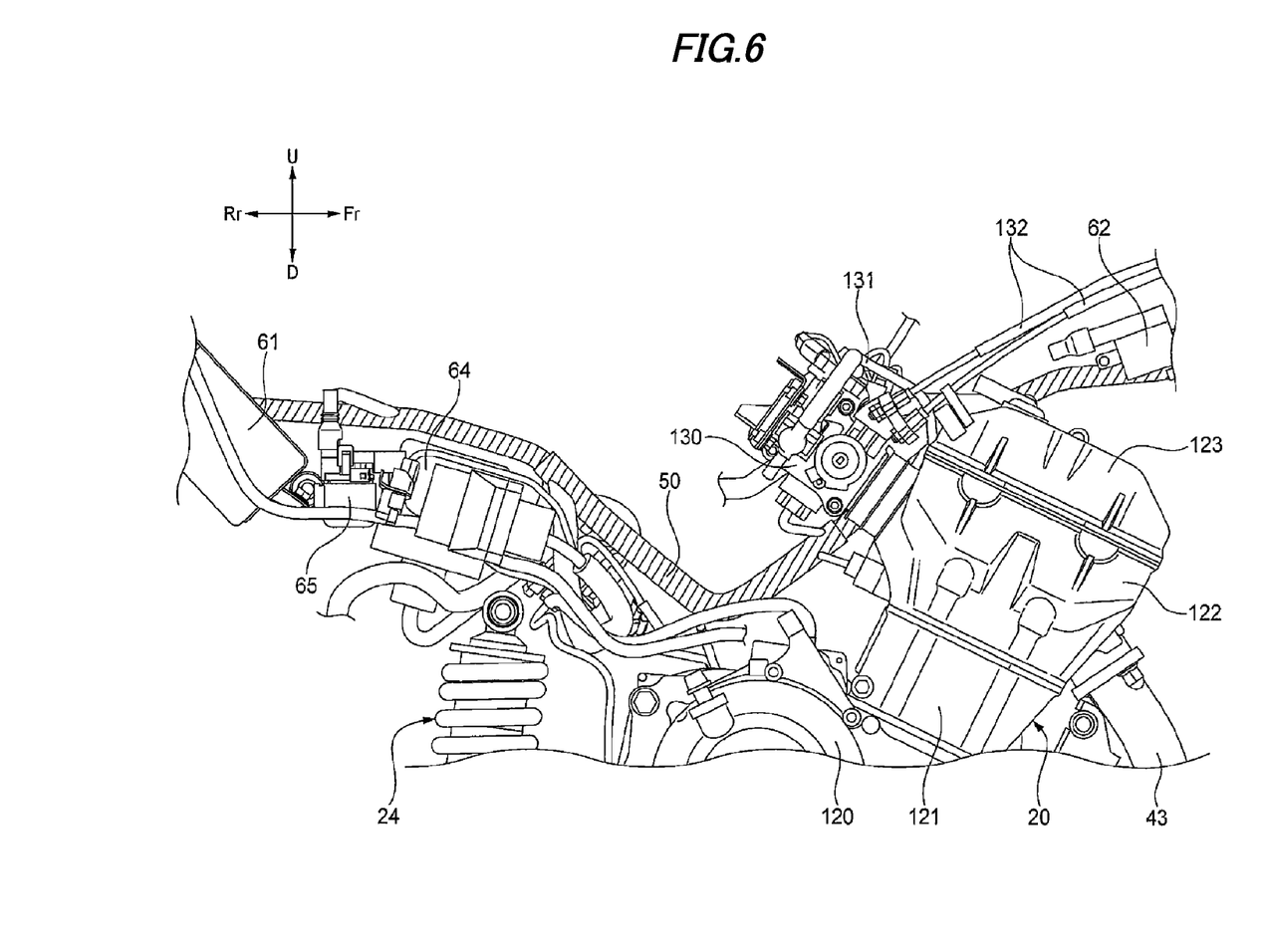
FIG. 6 is a right-side view of the peripheral part of the main harness shown in FIG. 2.
Figure 7:
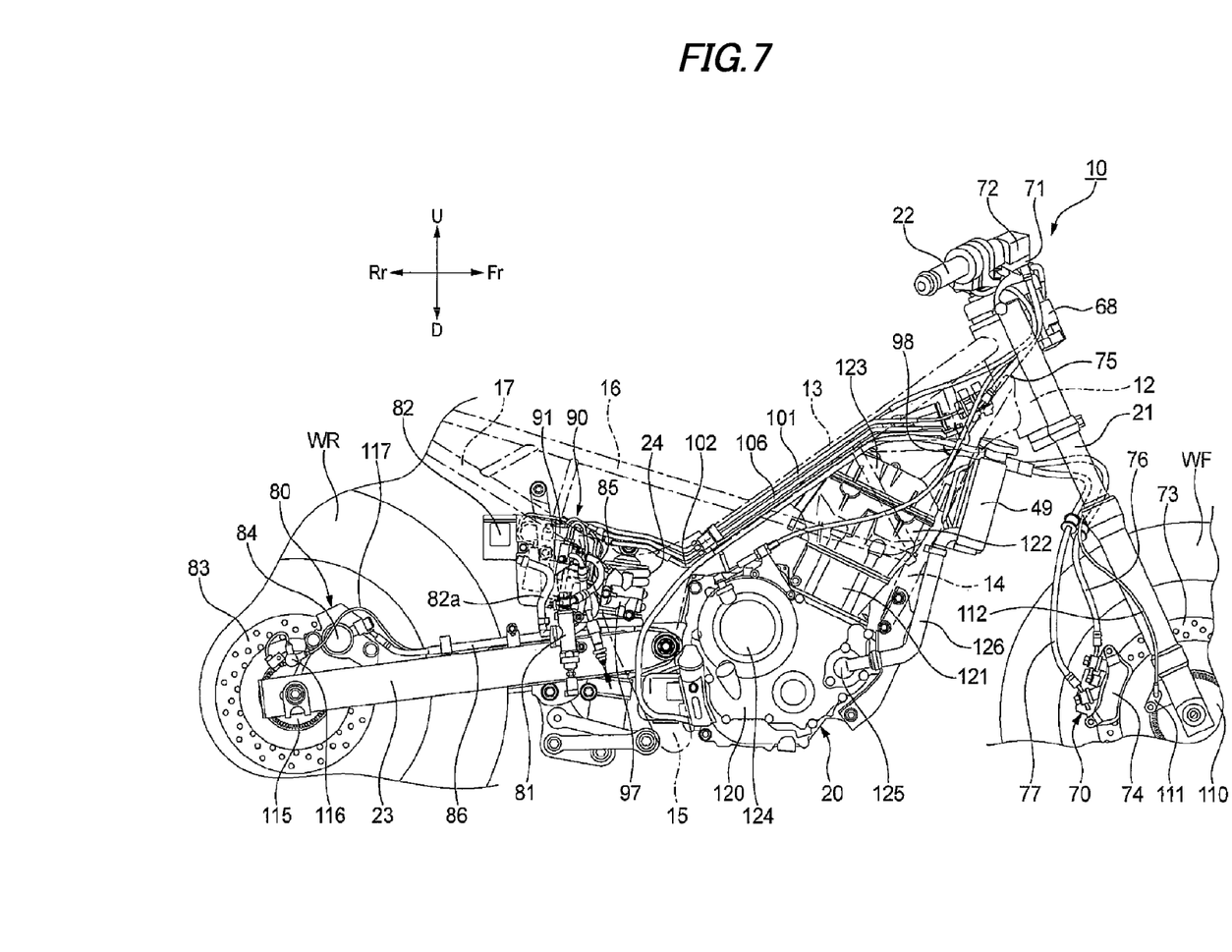
FIG. 7 is a right-side view of the motorcycle shown in FIG. 1 in which the vehicle body cover and the vehicle body frame are detached therefrom.

Meanwhile, in FIG. 2 and FIG. 7, reference numeral 120 denotes a crankcase of the engine 20, reference numeral 121 denotes a cylinder block joined to an upper part of the crankcase 120, reference numeral 122 denotes a cylinder head joined to an upper part of the cylinder block 121, and reference numeral 123 denotes a head cover joined to an upper part of the cylinder head 122. A transmission switching clutch 124 for switching connection and disconnection of power between a crank shaft and a main shaft not shown therein, and a water pump 125 connected to the radiator 49 via a water pipe 126 are attached to a right side portion of the crankcase 120. A clutch cable 127 connected to the transmission switching clutch 124 is connected to a clutch lever 140 (see FIG. 9). Meanwhile, as shown in FIG. 5, a starter motor 128 is arranged on an upper face and on the right side of the crankcase 120, which is connected to a starter magnetic switch 65 to be described later via a starter motor harness 129. In addition, as shown in FIG. 6, a throttle body 130 provided with a throttle drum 131 is connected to a rear side wall of the cylinder head 122. A throttle cable 132 connected to a base end side (see FIG. 9) of the handle 22 on the right side is wound around and coupled to the throttle drum 131.

Moreover, in this embodiment, as shown in FIG. 2 to FIG. 6, the motorcycle 10 includes a main harness 50 configured to supply power from a battery 61, which is arranged so as to be offset to the left with respect to a vehicle body center line CL, to multiple electrical components between the right and left pair of seat frames 16. This main harness 50 is placed along an inner side of the main frame 13, the down tube 14, the seat frame 16, the sub-frame 17, and the second reinforcing frame 18b which are arranged on the left side of the vehicle 10.

Figure 4:
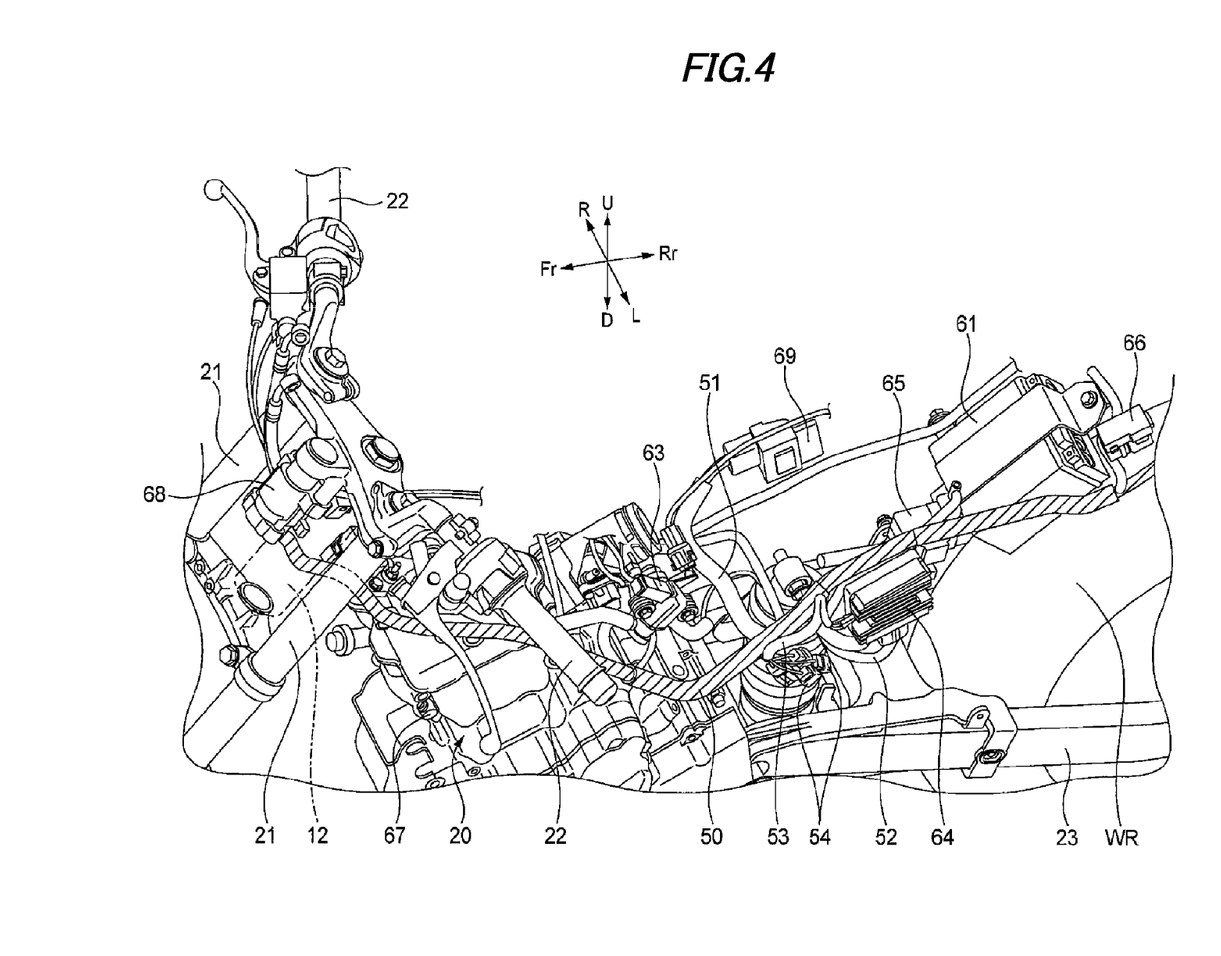
FIG. 4 is a perspective view of a peripheral part of a main harness shown in FIG. 2.

Here, the multiple electrical components include an ignition coil 62, an AI solenoid 63, a regulator 64, the starter magnetic switch 65, a fuse box 66, a heaterless $O_2$ sensor 67, a combination switch 68, an ECU 69, and the like. Moreover, the ignition coil 62, the AI solenoid 63, the regulator 64, the starter magnetic switch 65, the fuse box 66, and the heaterless $O_2$ sensor 67 are arranged on the left side relative to the vehicle body center line CL in a vehicle width direction and inside the main frames 13 and the seat frames 16. Note that the head light 36, the front blinkers 38, the tail light 40, and the rear blinkers 42 are electrical components as well. These electrical components are connected to the battery 61 by use of sub-harnesses 51, 52, 53, and the like which are branched off from the main harness 50. As shown in FIG. 4 and FIG. 5, reference numeral 51 denotes the sub-harness arranged behind the engine 20 so as to be connected to the ECU arranged on the right side relative to the vehicle body center line CL, reference numeral 52 denotes the sub-harness connected to the regulator 64, and reference numeral 53 denotes the sub-harness connected to the above-described electrical components via connectors 54. Meanwhile, in FIG. 3, reference numeral 61a denotes a positive terminal of the battery 61 and reference numeral 61b denotes a negative terminal of the battery 61. These are connected to the main frame 50 via the fuse box 66 by using unillustrated couplers.

Moreover, as shown in FIG. 7 to FIG. 12, the motorcycle 10 includes a front brake unit 70 configured to apply a braking force to the front wheel WF, a rear brake unit 80 configured to apply a braking force to the rear wheel WR, and an ABS system 90 configured to adjust the braking forces of the front brake unit 70 and the rear brake unit 80 and to adjust brake hydraulic pressures depending on brake lock conditions of the front and rear wheels WF and WR. Here, in FIG. 7, a front vehicle speed sensor 111 configured to detect revolution of the front wheel WF by use of a sensor rotor 110 fixed to the front wheel WF is connected to the ECU 69 via a sub-harness 112, and a rear vehicle speed sensor 116 configured to detect revolution of the rear wheel WR by use of a sensor rotor 115 fixed to the rear wheel WR is connected to the ECU 69 via a sub-harness 117.

The front brake unit 70 includes a front master cylinder 71 attached to a right end portion of the handle 22 and configured to apply the braking force to the front wheel WF, a front reserve tank 72 integrally formed with the front master cylinder 71, a front brake disc 73 attached to the right side of the front wheel WF, a front brake caliper 74 attached to a lower end portion of the front fork 21 on the right side and configured to sandwich the front brake disc 73, a first front brake hose 75 connected to the front master cylinder 71, and a second front brake hose 76 and a third front brake hose 77 connected to the front brake caliper 74.

The rear brake unit 80 includes a rear master cylinder 81 attached to the main step holder 45 on the right side and configured to apply the braking force to the rear wheel WR, a rear reserve tank 82 connected to the rear master cylinder 81 via a hose 82a, a rear brake disc 83 attached to the right side of the rear wheel WR, a rear brake caliper 84 attached to a lower end portion of the swing arm 23 on the right side and configured to sandwich the rear brake disc 83, a first rear brake hose 85 connected to the rear master cylinder 81, and a second rear brake hose 86 connected to the rear brake caliper 84.

As shown in FIG. 7 to FIG. 13, the ABS system 90 includes an ABS modulator 91 arranged so as to be offset to the right with respect to the vehicle body center line CL and configured to control hydraulic pressures in the ABS system 90, a first ABS pipe 101 configured to connect a first pressure receiving port 92 of the ABS modulator 91 to the first front brake hose 75, a second ABS pipe 102 configured to connect a first pressure feeding port 93 of the ABS modulator 91 to the second front brake hose 76, a third ABS pipe 103 configured to connect a second pressure receiving port 94 of the ABS modulator 91 to the first rear brake hose 85, a fourth ABS pipe 104 configured to connect a second pressure feeding port 95 of the ABS modulator 91 to a proportional control valve 97 (hereinafter simply abbreviated as the "PCV 97"), a fifth ABS pipe 105 configured to connect the PCV 97 to the second rear brake hose 86, and a sixth ABS pipe 106 configured to connect a third pressure feeing port 96 of the ABS modulator 91 to the third front brake hose 77. Note that the PCV 97 is configured to achieve improvement in running stability by adjusting a proportion of the hydraulic pressures to the front brake caliper 74 and the rear brake caliper 84.

Moreover, the first front brake hose 75, the second front brake hose 76, the third front brake hose 77, the hose 82a, the first rear brake hose 85, and the second rear brake hose 86 are formed of pressure-resistant hoses made of rubber. In the meantime, the first ABS pipe 101, the second ABS pipe 102, the third ABS pipe 103, the fourth ABS pipe 104, the fifth ABS pipe 105, and the sixth ABS pipe 106 are formed of pressure-resistant pipes made of metal.

Figure 8:
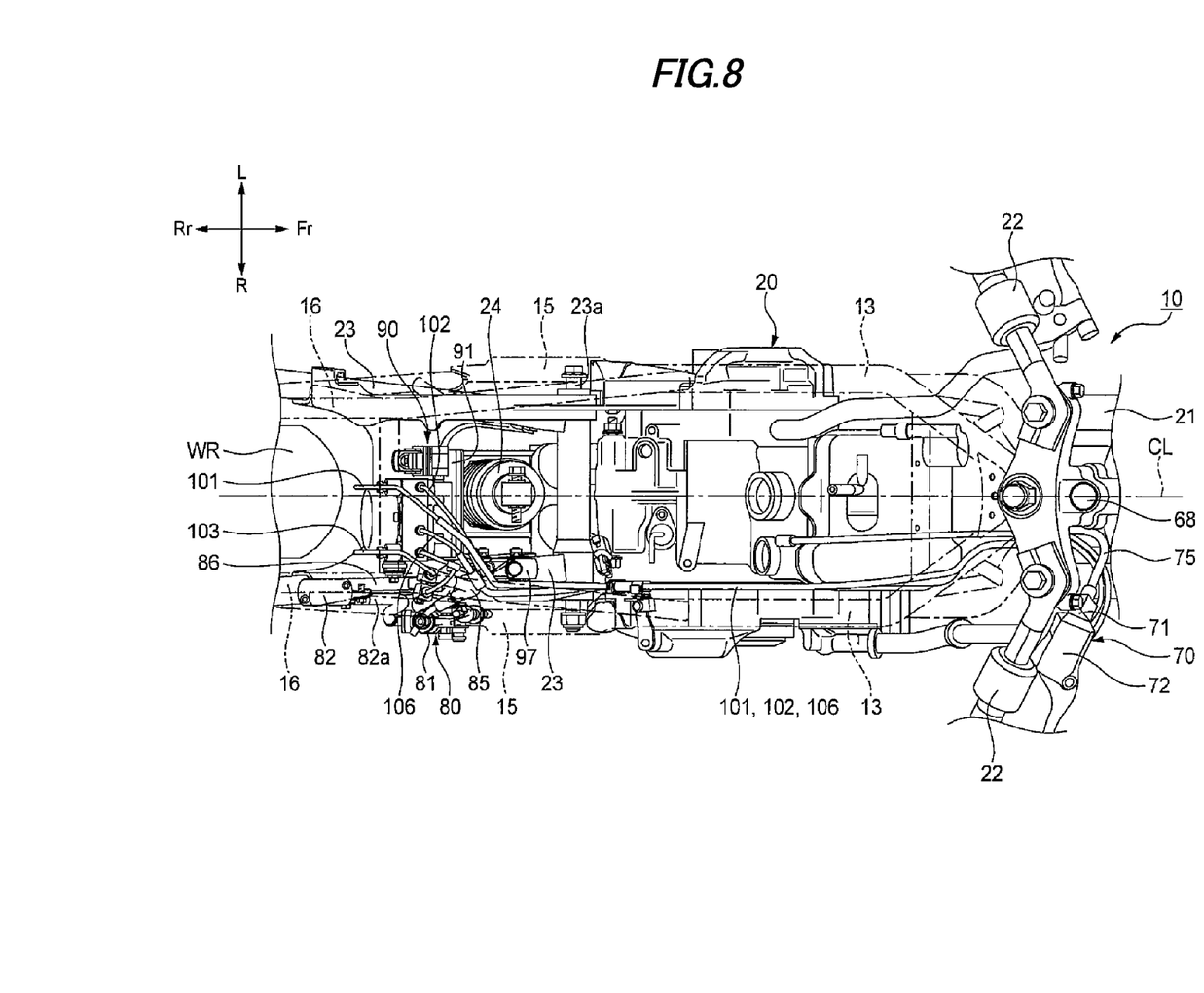
FIG. 8 is a perspective view of the motorcycle shown in FIG. 7.
Figure 9:
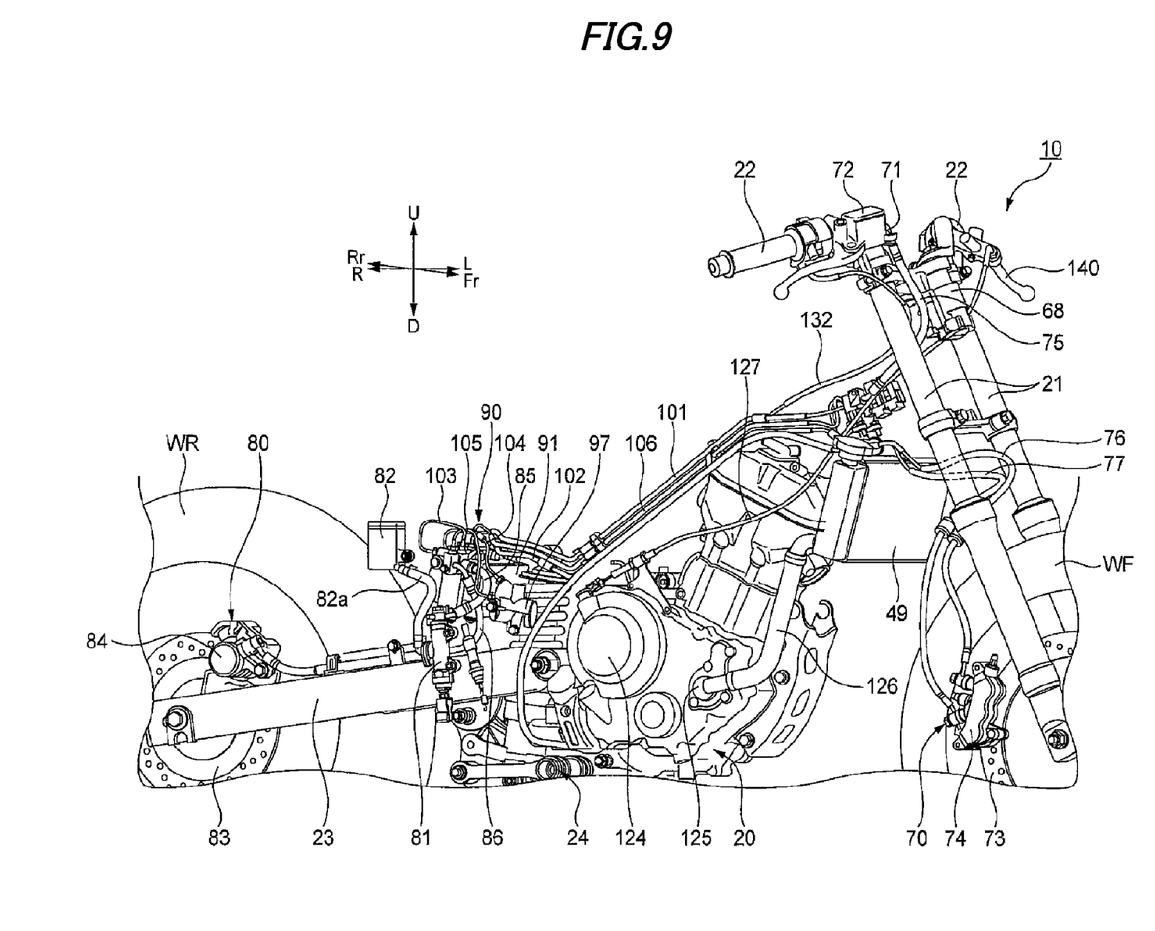
FIG. 9 is a perspective view of a peripheral part of ABS pipes shown in FIG. 7
Figure 10:
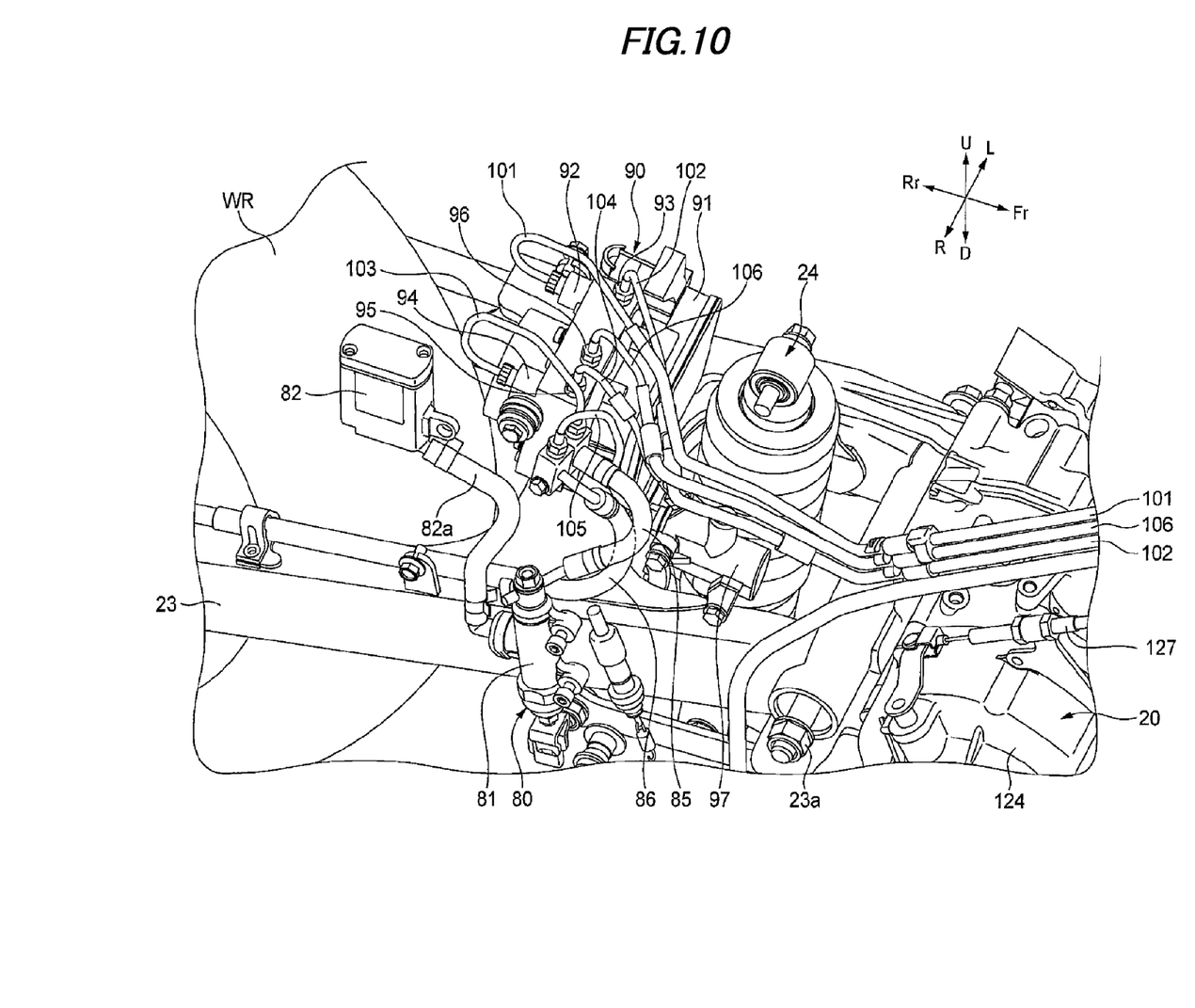
FIG. 10 is a perspective view of a peripheral part of an ABS module shown in FIG. 9.
Figure 11:
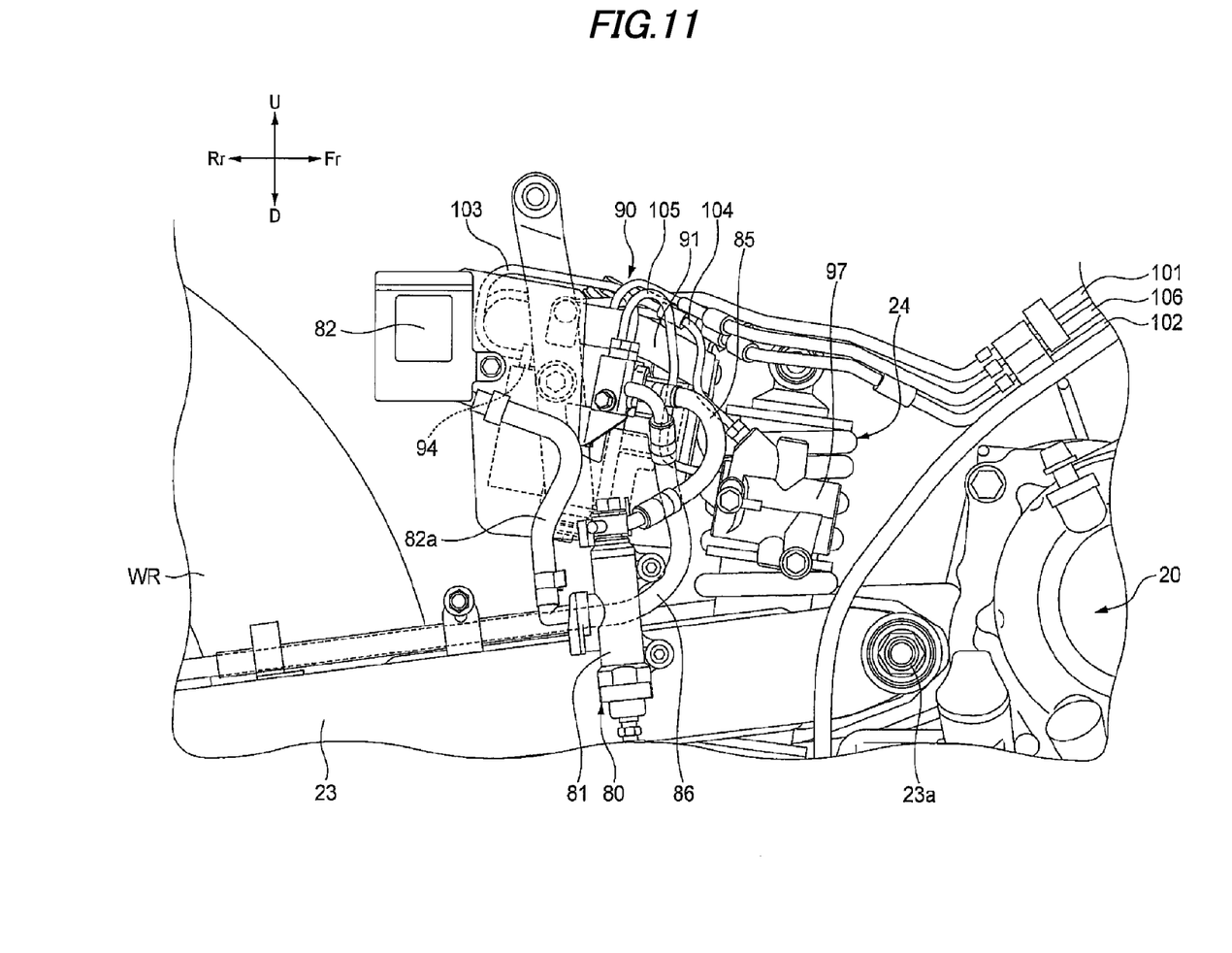
FIG. 11 is a right-side view of the peripheral part of the ABS module shown in FIG. 9.
Figure 12:
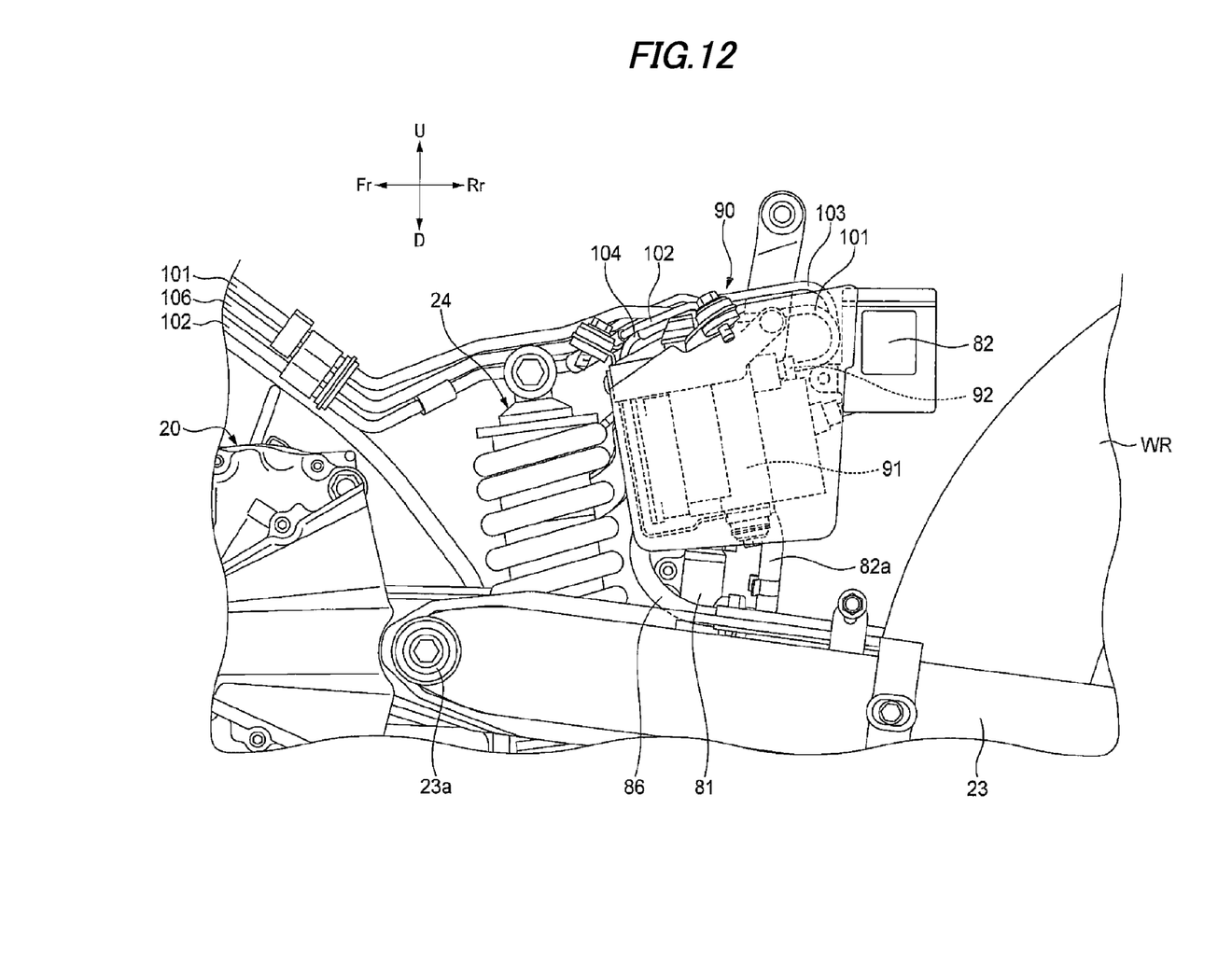
FIG. 12 is a left-side view of the peripheral part of the ABS module shown in FIG. 9.

Moreover, in this embodiment, as shown in FIG. 7 to FIG. 9, the first ABS pipe 101, the second ABS pipe 102, and the sixth ABS pipe 106 extend forward and substantially in parallel from the ABS modulator 91 and are placed along an inner side of the main frame 13 arranged on the right side of the vehicle 10.

Figure 13:
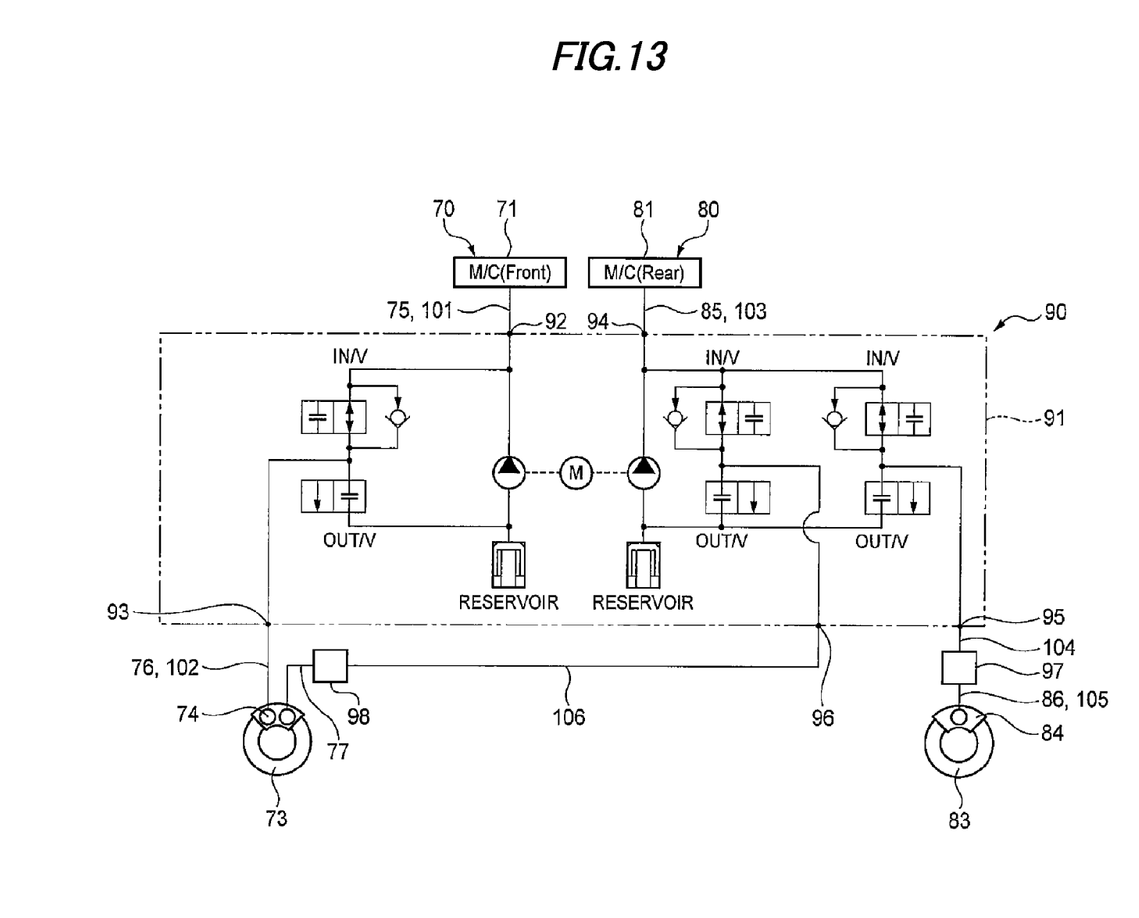
FIG. 13 is a schematic diagram of a hydraulic circuit.

According to the ABS system 90 configured as described above, a hydraulic pressure generated in the front master cylinder 71 is transmitted sequentially to the first front brake hose 75, to the first ABS pipe 101, to the ABS modulator 91, to the second ABS pipe 102, to the second front brake hose 76, and to the front brake caliper 74, thereby generating the braking force onto the front wheel WF.

Meanwhile, a hydraulic pressure generated in the rear master cylinder 81 is transmitted sequentially to the first rear brake hose 85, to the third ABS pipe 103, to the ABS modulator 91, to the fourth ABS pipe 104, to the PCV 97, to the fifth ABS pipe 105, to the second rear brake hose 86, and to the rear brake caliper 84 and is also supplied sequentially to the ABS modulator 91, to the sixth ABS pipe 106, to a delay valve 98, to the third front brake hose 77, and to the front brake caliper 74, thereby generating the braking force onto the front wheel WF.

As described above, according to the motorcycle 10 of this embodiment, the main harness 50 is arranged on the left side of the vehicle while the ABS pipes 101, 102 and 106 are arranged on the right side of the vehicle. Hence a distinction can be easily made between the main harness 50 and the ABS pipes 101, 102 and 106. Thus, operations for assembly and piping of the main harness 50 as well as the ABS pipes 101, 102 and 106 can be facilitated to improve productivity of the motorcycle 10.

Moreover, according to the motorcycle of this embodiment, the main harness 50 is arranged along the main frame 13, the down tube 14, the seat frame 16, the sub-frame 17, and the second reinforcing frame 18b which are arranged on the left side of the vehicle while the ABS pipes 101, 102 and 106 are arranged along the main frame 13 on the left side of the vehicle. Hence the distinction between the main harness 50 and the ABS pipes 101, 102 and 106 can be easily made by the right and left frames. Thus, the operations for assembly and piping of the main harness 50 and the ABS pipes 101, 102 and 106 can be further facilitated to further improve productivity of the motorcycle 10.

Moreover, according to the motorcycle 10 of this embodiment, the brake calipers 74 and 84 for the front wheel WF and the rear wheel WR are provided on the vehicle while being offset to the right with respect to the vehicle body center line CL, and the battery 61 is provided on the vehicle while being offset to the left with respect to the vehicle body center line CL. Meanwhile, the ABS modulator 91 of the ABS system 90 is provided on the vehicle while being offset to the right with respect to the vehicle body center line CL. The main harness 50 is provided along the main frame 13, the down tube 14, the seat frame 16, the sub-frame 17 and the second reinforcing frame 18b on the left side of the vehicle while the ABS pipes 101, 102 and 106 are provided on the main frame 13 on the right side of the vehicle. Therefore, the main harness 50 including the multiple electrical wires and having no limitation of flexibility of design is arranged on the left side of the vehicle as in the case of the battery 61 while the ABS pipes 101, 102 and 106 being made of the metallic pipes and having a limitation of flexibility of design are arranged on the right side of the vehicle as in the case of the brake calipers 76 and 84 for the front wheel WF and the rear wheel WR as well as the ABS modulator 91. Thus, lengths of the ABS pipes 101, 102 and 106 can be minimized to suppress manufacturing costs of the motorcycle 10.

Moreover, according to the motorcycle of this embodiment, all of the engine electrical components including the ignition coil 62, the AI solenoid 63, the regulator 64, the starter magnetic switch 65, the fuse box 66, and the heaterless $O_2$ sensor 67 are arranged on the left side relative to the vehicle body center line CL. Therefore, all of the ignition coil 62, the AI solenoid 63, the regulator 64, the starter magnetic switch 65, the fuse box 66, and the heaterless $O_2$ sensor 67 are arranged on the same side as the main harness 50 which is arranged on the left side of the vehicle. Thus, as compared with the case where at least one of the above-described engine electrical components is arranged on the right side relative to the vehicle body center line CL, the length of the main harness 50 can be minimized to further suppress manufacturing costs of the motorcycle, and to further facilitate a wiring operation of the main harness 50.

The present invention has been hitherto described in detail and with reference to the specific embodiments, but it is apparent to those skilled in the art that the present invention can be changed or modified in various manners without departing from the spirit and scope of the present invention. This application is based on Japanese Patent Application (2009-200502) filed on Aug. 31, 2009, and the contents of which are incorporated herein by reference.

EXPLANATION OF THE REFERENCE NUMERALS

10 MOTORCYCLE
11 VEHICLE BODY FRAME
13 MAIN FRAME
14 DOWN TUBE
15 PIVOT PLATE
16 SEAT FRAME
17 SUB-FRAME
18b SECOND REINFORCING FRAME
50 MAIN HARNESS
61 BATTERY
62 IGNITION COIL
63 AI SOLENOID
64 REGULATOR
65 STARTER MAGNETIC SWITCH
66 FUSE BOX
67 HEATERLESS $O_2$ SWITCH
70 FRONT BRAKE UNIT
71 FRONT MASTER CYLINDER
74 FRONT BRAKE CALIPER
75 FIRST FRONT BRAKE HOSE
76 SECOND FRONT BRAKE HOSE
77 THIRD FRONT BRAKE HOSE
80 REAR BRAKE UNIT
81 REAR MASTER CYLINDER
84 REAR BRAKE CALIPER
85 FIRST FRONT BRAKE HOSE
86 SECOND FRONT BRAKE HOSE
90 ABS SYSTEM
91 ABS MODULATOR
101 FIRST ABS PIPE
102 SECOND ABS PIPE
103 THIRD ABS PIPE
104 FOURTH ABS PIPE
105 FIFTH ABS PIPE
106 SIXTH ABS PIPE
CL VEHICLE BODY CENTER LINE

The invention claimed is:

1. A motorcycle comprising:
a main harness connected to a battery and arranged to extend in a front-to-back direction of a vehicle in order to supply electric power to a plurality of electrical components provided on the vehicle;
an anti-lock braking system connected to brake calipers for a front wheel and a rear wheel and configured to adjust a brake hydraulic pressure depending on brake lock conditions of the front wheel and the rear wheel;
an anti-lock braking system pipe configured to transmit the brake hydraulic pressure of the anti-lock braking system; and
a vehicle body frame including a right and left pair of frames,
wherein the main harness and the anti-lock braking system pipe are arranged along the right and left pair of frames,
wherein the main harness is provided on the left frame of the right and left pair of the frames and the anti-lock braking system pipe is provided on the right frame of the right and left pair of the frames, and
wherein the brake calipers for the front wheel and the rear wheel are provided on the vehicle while being offset to the right with respect to a vehicle body center line, and an anti-lock braking system modulator of the anti-lock braking system is provided on the vehicle while being offset to the right with respect to the vehicle body center line,
wherein the battery is provided on the vehicle while being offset to the left with respect to the vehicle body center line,
wherein the motor cycle further comprises engine electrical components including an ignition coil, an AI solenoid, a regulator, a starter magnetic switch, a fuse box and a heaterless oxygen sensor, and wherein all of the engine electrical components are arranged on the left side of the vehicle body center line.

* * * * *